United States Patent [19]

Smith et al.

[11] 4,373,001
[45] Feb. 8, 1983

[54] MOLDED TEXTILE AIR CONDITIONING AND HEAT DUCT

[75] Inventors: Gerald J. Smith; Ronald W. Adams, both of Auburn, Me.

[73] Assignee: Albany International Corp., Menands, N.Y.

[21] Appl. No.: 365,358

[22] Filed: Apr. 5, 1982

[51] Int. Cl.³ .............................................. B32B 7/02
[52] U.S. Cl. .................................... 428/212; 428/234; 428/246; 428/252; 428/253; 428/300
[58] Field of Search ............... 428/212, 234, 246, 252, 428/253, 300; 98/2

[56] References Cited

U.S. PATENT DOCUMENTS 3,867,240  2/1975  Doerfling .......................... 428/170
4,172,918  10/1979  Doerer .............................. 428/174

Primary Examiner—James J. Bell
Attorney, Agent, or Firm—Kane, Dalsimer, Kane, Sullivan and Kurucz

[57] ABSTRACT

A gas permeable, self-supporting, molded textile duct which matches the surrounding area in color and texture is disclosed which is useful to convey heated or conditioned air. The ducting is particularly useful for the interior of recreational vehicles. The ducting is prepared by thermomolding techniques.

1 Claim, 3 Drawing Figures

MOLDED TEXTILE AIR CONDITIONING AND HEAT DUCT

BACKGROUND OF THE INVENTION

1. Field of the Invention

The invention relates to fluid ducting and more particularly relates to decorative, molded ducts for heating and air conditioning. The molded ducts of the invention are particularly useful in transportation vehicles. The invention also relates to a method of fabricating the ducts of the invention.

2. Brief Description of the Prior Art

The literature is replete with descriptions of prior art ducting and its use in the air conditioning and heating of enclosed spaces, such as the interior of transportation vehicles. Representative of such prior art descriptions are those found in U.S. Pat. Nos. 2,768,026; 2,523,104; 3,362,317; 3,697,125; 3,867,240; 3,953,067; and 4,172,918.

The ducts of the present invention are advantageous over prior art ducts in that they distribute air more evenly than prior art ducts, thereby reducing unwanted drafts. The ducts of the invention are particularly useful for distributing conditioned or heated air within recreational vehicles.

In many larger recreational vehicles, with permanently installed air conditioners, cool air is distributed along the roof of the vehicle through diffusers or ducts made of a perforated sheet material running down the full length of the interior compartment. In the same vehicles, a non-woven carpet-like covering is generally installed on the ceiling for sound damping and improved appearance. The porous duct work passing through the center of this headliner usually requires a framework. The duct work together with framework is relatively costly to install and is often objectionable in appearance. The present invention provides a self-supporting porous duct having an appearance similar to the surrounding headliner material, thus providing an attractive appearance, ease of installation, rigidity and permeability in one product.

SUMMARY OF THE INVENTION

The invention comprises a gas permeable, self-supporting, decorative, air conditioning and heater duct, which comprises;

a core of non-woven, synthetic textile first fibers characterized in part by a first temperature softening point, in admixture with heat-softened and rehardened, synthetic thermoplastic, textile second fibers characterized by a second, lower temperature softening point;

first and second outer layers which together sandwich the core, each of said outer layers being a fabric of heat-softened and rehardened interwoven or knitted textile yarns; and a decorative layer of decorative, non-woven staple textile fibers having a softening point temperature above the softening point temperature of the second fibers, adhered to the exposed surface of one of said first and second outer layers;

said core, first and second outer layers and decorative layer being interengaged with each other, said interengagement being of the character associated with needled fibrous fabrics;

said first fibers and said second fibers being interlocked with each other and the yarns of the first and second outer layers at points of contact by the heat-softening and rehardening of the second fibers and the yarns.

DETAILED DESCRIPTION OF THE PREFERRED EMBODIMENTS OF THE INVENTION

Figure 1:
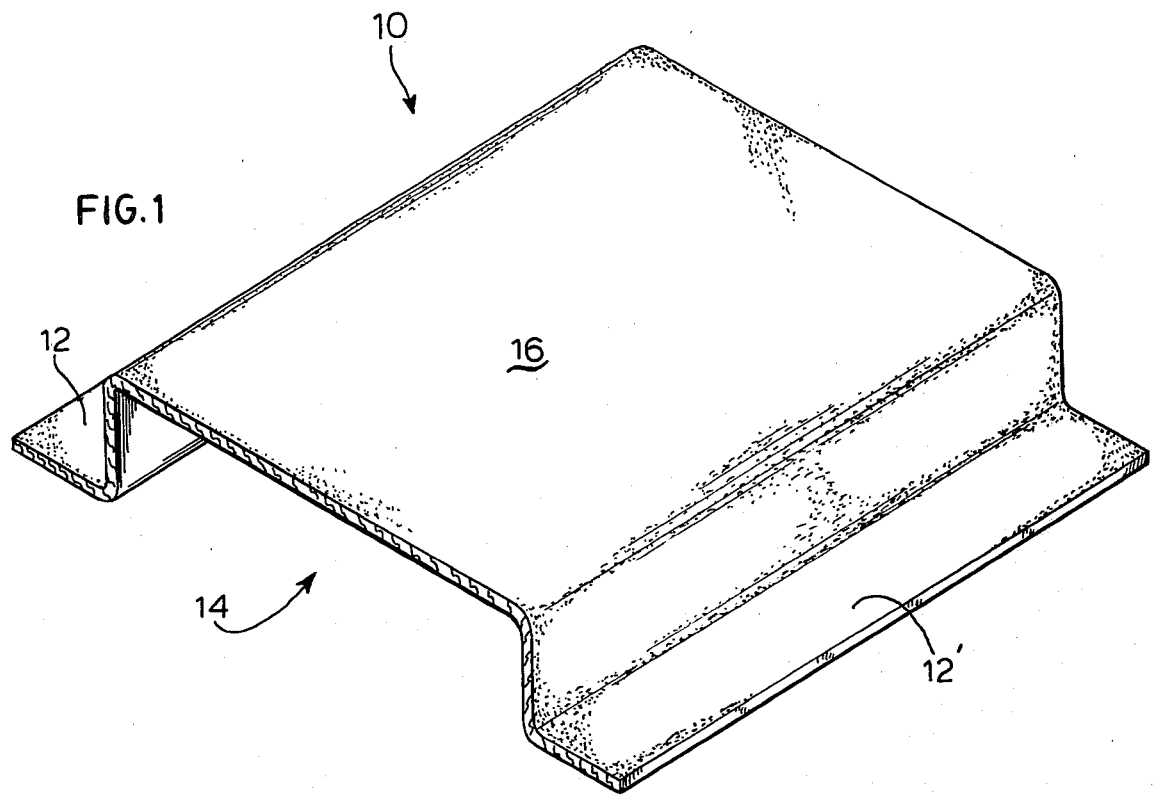
FIG. 1 is a view-in-perspective of a portion of an embodiment duct of the invention.

FIG. 1 is a view-in-perspective of a portion of an embodiment duct 10 of the invention. The duct 10 is a self-supporting, decorative, molded duct consisting of a four layer combination of woven and knit fibrous textile materials. The duct 10 is gas-permeable (through the body thereof) and may be installed on the inner surfaces of an enclosed area such as a recreational vehicle, by attachment through lateral flanges 12, 12'. When so attached, a conduit or passage 14 is formed between the central portion 16 of duct 10 and the interior surface of the compartment or enclosure receiving the installation. The duct 10 is molded so as to form a gas-permeable textile structure as will be described hereinafter. The duct 10 may be molded in any desired shape, size or configuration.

Figure 2:
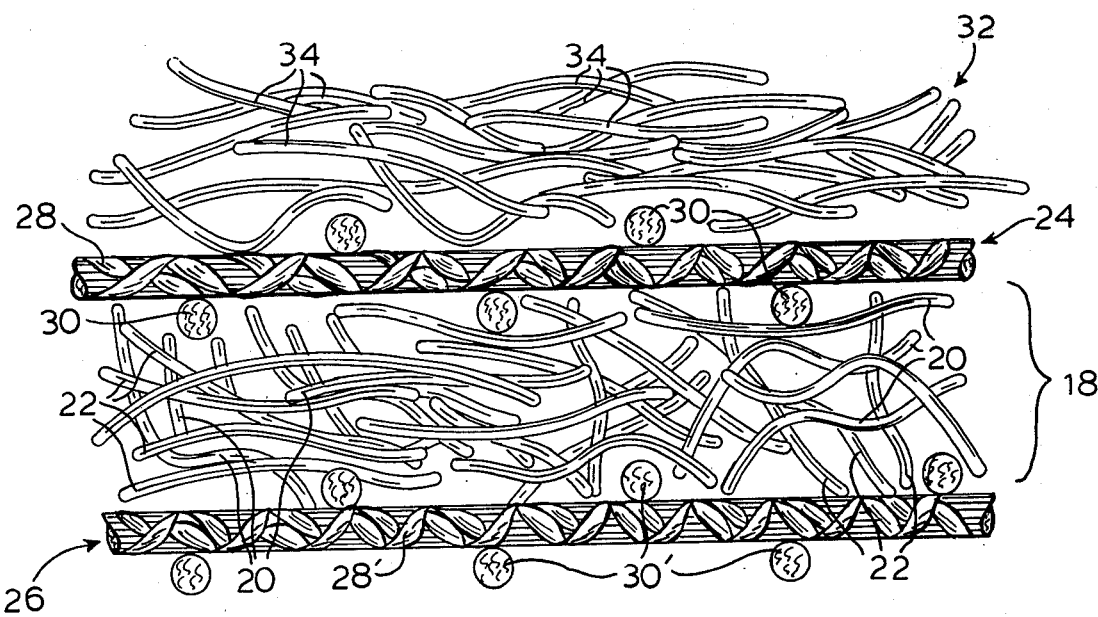
FIG. 2 is a cross-sectional, side elevation of a portion of the fabric (greatly enlarged) used to mold the duct of FIG. 1.

FIG. 2 is a cross-sectional, side elevation of a portion of the fabric (greatly enlarged) used to mold the duct of FIG. 1. As shown in FIG. 2, the fabric which comprises central portion 16 of duct 10 and the integrated lateral flanges 12, 12' comprises a core layer 18 of non-woven, synthetic textile fibers 20 in admixture with a second, synthetic, textile fiber 22. Both of the fibers 20 and 22 may be heat fusible, thermoplastic textile fibers such as textile fibers of polyethylene, polypropylene, polyester, polyamide and like fibers. However, fibers 20 in comparison to fibers 22 must be characterized in part by a softening and/or melt point which is at a temperature substantially lower than exhibited by fibers 22. An example of the blend of fibers 20, 22 making up core 18 would be a 50-50 blend of thermoplastic fibers having a relatively low temperature softening point such as polypropylene or polyethylene fibers blended with relatively higher temperature softening point fibers such as textile fibers of polyester or polyamide. Other ratios of such blends may be employed, i.e.; blends within the range of from about 23 to about 75 percent of the lower softening point textile fibers.

The core 18 of non-woven fibers 20, 22 is sandwiched between first outer layer 24 and second outer layer 26, each of said layers 24, 26 being a fabric of interwoven or knitted textile yarns. The FIG. 2 shows layer 24 as made up of knitted yarns 28, 30. The yarns 28, 30 are preferably, made up from a thermoplastic resin material having a temperature softening point close to that of the above-described fibers 20 or at least substantially lower than the softening point of the above-described fillers 22. Preferably yarns 28, 30 are yarns of polypropylene in an open knit. The layer 24 may be identical to layer 26 in construction and the corresponding yarns are identified by the symbols 28' and 30'. As a decorative facing for the sandwich made up of layers 18, 24 and 26 is a decorative layer 32 of non-woven, staple textile fibers 34 adhered to the exposed surface of layer 24. The fibers 34 are advantageously of a synthetic, thermoplastic resin material having a temperature softening point above that of the fibers 20 and above that of the yarns 28, 28', 30 and 30'. Such fibers 34 are represented by selected polyester, polyamide, polypropylene, modacrylic or like textile fibers which may be of a coloration suitable for matching the headliner in the recreational vehicle to which the ducting 10 is to be installed.

The structure of the fabric shown in FIG. 2 is consolidated by needling of the entire structure so that the layer 32 is actually attached to the underlying layers through entanglement and interengagement of the fibers 34 with the knitted layers 24, 26 and the nonwoven layer 18. This entanglement and interengagement of the fibers within the structure shown in FIG. 2 is not shown in the FIG. 2 for clarity. However, those skilled in the art will readily appreciate that through the needling process some of the fibers in layers 32 and 18 are oriented in a vertical position and interengaged with each other and with the yarns making up the layers 24, 26. This consolidates and adds integrity to the layers so that in fact an integrated but multilayered fabric is formed. The procedure and technique for needling is well-known to those skilled in the art and need not be recited herein; see for example the description of needling given in U.S. Pat. Nos. 2,059,132; 2,910,763; and 3,684,284. Following needling of the fabric as described above, the fabric is molded under heat to provide the ducting 10 shown in FIG. 1. Molding may be carried out by placing the needled fabric under tension and then heating it to or preferably slightly above the softening point temperature of the yarns in layers 24 and 26 and of the fibers 20 while avoiding higher temperatures which would reach the softening point temperature of fibers 22. Under these conditions, the lower softening point materials become tacky. By placing the heated fabric in a molding press, it can be formed and molded in the desired configuration, advantageously under conditions of pressure wherein the thermoplasticized components conform to and interlock with adjacent components. Techniques and apparatus for thermoforming textiles are well-known and details need not be recited herein. When allowed to cool and upon removal from the mold, the heat-softened and plasticized components harden and shape around fibers and yarns at contact points to interlock and to impart self-supporting rigidity to the fabric, without closing the fabric to air flow.

Figure 3:
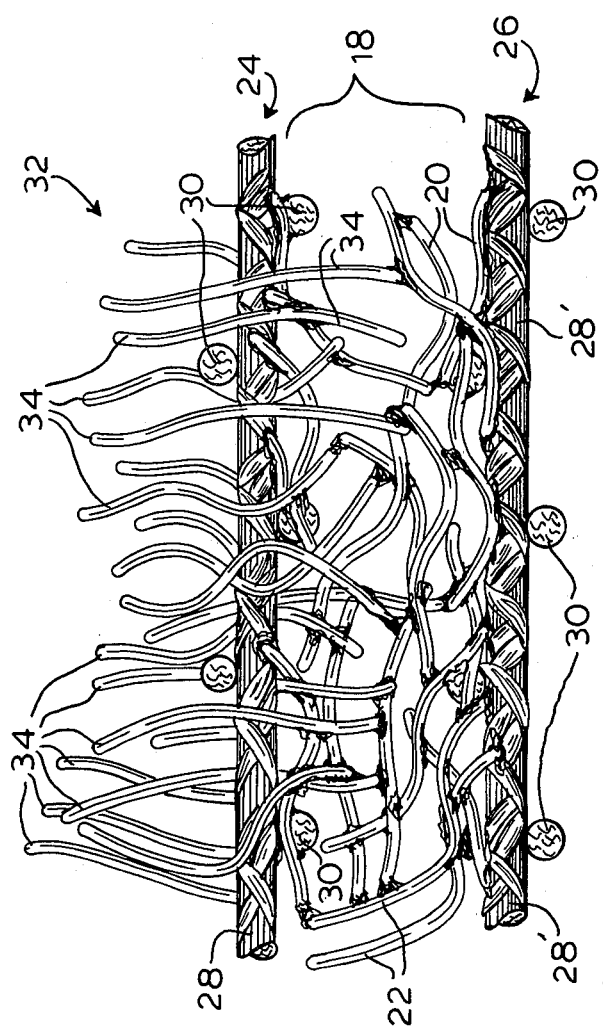
FIG. 3 is a view as in FIG. 2 but after molding.

Referring now to FIG. 3, one can see that the heat-softened and rehardened fibers 20 and yarns 28, 28', 30, 30' conform and interlock together with fibers 22 at points of contact, leaving the surface fibers 34 free and unmodified as a decorative surface.

The ducting 10 of the invention may be prepared in a wide variety of weights, densities and gas (air) permeabilities, depending on the weights of fibers, fabrics and yarns used. The degree of needling and the pressure exerted during thermoforming will also affect air permeability. Trial and error technique will provide any desired optimum permeability characteristic. In general, air permeabilities in the range of from 20 to 250 CFM/ft$^2$ at 0.5 inches water pressure drop are advantageous.

The following example describes the manner and process of making and using the invention and sets forth the best mode contemplated by the inventors for carrying out the invention but is not to be considered as limiting the scope of the invention.

EXAMPLE

A 32 foot recreational vehicle required a 22 foot long air diffusion duct. A center mounted fan produced 900 cubic feet of air per minute (CFM) total air flow. A standard perforated foam-backed vinyl material, rated at 107 CFM per square foot of area at $\frac{1}{2}$" water pressure drop, allowed a total air flow of 740 CFM when installed in the standard duct procedure. A typical duct material of this invention was produced with an outer surface of 12 ounces per square yard (oz./yd.$^2$) weight comprised of 25%, 15 denier 3" staple length polyester fiber and 75%, 25 denier 3" staple length polyester fiber suitably dyed for a pleasing color, a core layer of 14 oz/yd.$^2$ comprised of 30%, 25 denier 3" staple length polyester fiber and 70% blend of 6 denier to 30 denier random length polypropylene fiber having an average of 20 denier, and 2 layers of 8.5 oz./yd.$^2$ 100% polypropylene raschel knit construction with $\frac{3}{8}$" diameter openings. These 4 components were joined together by the needling process to produce a final 43 oz./yd.$^2$ weight. This material was preheated in a through-air oven at a temperature just above the softening point of polypropylene or approximately 360° F., then formed into the duct shape between matched molds having a 6 mm gap and allowed to cool to room temperature. The formed duct had an air permeability of 140 CFM per square foot of area at $\frac{1}{2}$" water pressure drop. A 22 foot long duct was fabricated in 3 sections with a 2" wide flange for mounting to the ceiling of the recreational vehicle. The duct had 2 joints, each $1\frac{1}{8}$" long, which overlapped sections to prevent undesirable air leakage. The area of the duct directly under the cooling air discharge fan was blocked over with an impermeable membrane to avoid drafts. The duct was 2 feet wide and 2 inches deep. When installed in a recreational vehicle it allowed a total air flow of 760 CFM. An environmental test disclosed a decrease in vehicle temperature from 85° F. to 73° F. in 8 minutes with no sensation of air movement in the vehicle. Cool air could be felt dropping from the duct at no further than 4" distance from the duct by an observer. Appearance and function were both judged to be superior to standard air diffusion ducting.

What is claimed:

1. A gas-permeable, self-supporting, decorative, air conditioning and heater duct, which comprises;
   a core of non-woven, synthetic textile first fibers characterized in part by a first temperature softening point, in admixture with heat softened and rehardened, synthetic, thermoplastic, textile second fibers, characterized in part by a second, lower, temperature softening point;
   first and second outer layers which together sandwich the core, each of said outer layers being a fabric of heat-softened and rehardened interwoven or knitted textile yarns; and
   a decorative layer of decorative non-woven staple textile fibers having a softening point temperature above the softening point temperature of the second fibers, adhered to the exposed surface of one of said first and second outer layers;
   said core, first and second outer layers and decorative layer being interengaged with each other, said interengagement being of the character associated with needled fibrous fabrics;
   said first fibers and said second fibers being interlocked with each other and the yarns of the first and second outer layers at points of contact by the heat softening and rehardening of the second fibers and the yarns.

* * * * *